US012146351B2

(12) United States Patent
Konrad et al.

(10) Patent No.: US 12,146,351 B2
(45) Date of Patent: Nov. 19, 2024

(54) LOCKING DEVICE FOR A VEHICLE DOOR OF A MOTOR VEHICLE

(71) Applicant: DAIMLER AG, Stuttgart (DE)

(72) Inventors: Tobias Konrad, Böblingen (DE); Martin Lindmayer, Sulz (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 588 days.

(21) Appl. No.: 17/604,061

(22) PCT Filed: Mar. 19, 2020

(86) PCT No.: PCT/EP2020/057543
§ 371 (c)(1),
(2) Date: Oct. 15, 2021

(87) PCT Pub. No.: WO2020/212064
PCT Pub. Date: Oct. 22, 2020

(65) Prior Publication Data

US 2022/0154499 A1 May 19, 2022

(30) Foreign Application Priority Data

Apr. 17, 2019 (DE) ..................... 10 2019 002 873.2

(51) Int. Cl.
*E05B 81/90* (2014.01)
*E05B 43/00* (2006.01)
(Continued)

(52) U.S. Cl.
CPC .............. *E05B 81/90* (2013.01); *E05B 77/02* (2013.01); *E05B 81/08* (2013.01); *E05B 81/58* (2013.01);
(Continued)

(58) Field of Classification Search
CPC .......... E05B 77/02; E05B 81/90; E05B 81/08; E05B 81/58; E05B 81/64; E05B 83/36;
(Continued)

(56) References Cited

U.S. PATENT DOCUMENTS 3,741,347 A * 6/1973 Kirsch .................... B66B 1/468 187/389
4,381,829 A * 5/1983 Montaron ............... E05B 77/12 180/274
(Continued)

FOREIGN PATENT DOCUMENTS

DE 4228233 A1 * 3/1994 ............. E05B 77/26
DE 19924447 A1 10/2000
(Continued)

OTHER PUBLICATIONS

Office Action created Sep. 16, 2022 in related/corresponding DE Application No. 10 2019 002 873.2.
(Continued)

*Primary Examiner* — Christine M Mills
*Assistant Examiner* — Faria F Ahmad
(74) *Attorney, Agent, or Firm* — PATENT PORTFOLIO BUILDERS PLLC

(57) ABSTRACT

A motor vehicle locking device for a vehicle door includes a door lock that can be released electrically released and, parallel thereto, mechanically released via a mechanical operative connection to a first actuatable door handle. A coupling is arranged in the mechanical operative connection between the door handle and the door lock, which coupling can be engaged and disengaged via a coupling motor. A control unit is connected to a crash sensor for detecting an accident. In the normal operating state, the coupling is always in the disengaged state irrespective of opening requirements and, in addition to the coupling motor, can be
(Continued)

engaged and disengaged by an electromagnetic actuating device that engages the coupling when the power is switched off. A first timer can be triggered by the signal of the crash sensor, such that the control unit, after the first timer elapses after receiving a crash signal, activates the coupling motor to engage the coupling. Accordingly, the mechanical active connection between the door handle and the lock is always disengaged, except in an accident situation.

17 Claims, 1 Drawing Sheet

(51) Int. Cl.

| | |
|---|---|
| ***E05B 77/02*** | (2014.01) |
| ***E05B 81/08*** | (2014.01) |
| ***E05B 81/58*** | (2014.01) |
| ***E05B 81/64*** | (2014.01) |
| ***E05B 83/36*** | (2014.01) |

(52) U.S. Cl.
CPC .............. *E05B 81/64* (2013.01); *E05B 83/36* (2013.01); *E05B 43/005* (2013.01)

(58) Field of Classification Search
CPC .......... E05B 77/12; E05B 81/25; E05B 81/76; E05B 43/005
See application file for complete search history.

(56) References Cited

U.S. PATENT DOCUMENTS

| | | | | |
|---|---|---|---|---|
| 5,802,894 | A * | 9/1998 | Jahrsetz | E05B 81/14 292/201 |
| 6,290,269 | B1 * | 9/2001 | Bodley-Scott | E05B 81/25 292/216 |
| 11,280,121 | B2 * | 3/2022 | Sardelli | E05B 15/004 |
| 11,959,315 | B2 * | 4/2024 | Trescases | H02J 7/007182 |
| 2007/0145821 | A1 * | 6/2007 | Mekky | E05B 81/54 307/10.1 |
| 2008/0224482 | A1 * | 9/2008 | Cumbo | E05B 81/40 292/201 |
| 2015/0069766 | A1 * | 3/2015 | Estrada | E05B 77/12 292/194 |
| 2015/0330114 | A1 * | 11/2015 | Linden | E05B 81/00 292/194 |
| 2015/0330116 | A1 * | 11/2015 | Dente | B60L 58/15 307/10.1 |
| 2016/0002959 | A1 * | 1/2016 | Javadzadeh | E05B 81/56 701/46 |
| 2017/0314302 | A1 * | 11/2017 | Marlia | E05B 81/56 |
| 2023/0068522 | A1 * | 3/2023 | Tokudome | E05B 81/06 |
| 2023/0079726 | A1 * | 3/2023 | Cetnar | E05B 81/90 292/201 |
| 2023/0104484 | A1 * | 4/2023 | Cumbo | E05B 81/30 70/278.7 |

FOREIGN PATENT DOCUMENTS

| | | | | |
|---|---|---|---|---|
| DE | 102013110559 | A1 * | 3/2015 | E05B 43/005 |
| DE | 202016100521 | U1 | 2/2016 | |
| DE | 102015008122 | A1 | 12/2016 | |
| DE | 102017206543 | A1 | 11/2017 | |
| DE | 102016114494 | A1 | 2/2018 | |
| DE | 102017008519 | A1 | 3/2019 | |
| DE | 102022105222 | A1 * | 9/2022 | E05B 81/06 |
| EP | 3396089 | A1 | 10/2018 | |

OTHER PUBLICATIONS

Office Action dated Aug. 23, 2022 in related/corresponding CN Application No. 202080029408.5.
Office Action created Mar. 13, 2024 in related/corresponding DE Application No. 10 2019 002 873.2.
International Search Report mailed Jun. 25, 2020 in related/corresponding International Application No. PCT/EP2020/057543.
Written Opinion mailed Jun. 25, 2020 in related/corresponding International Application No. PCT/EP2020/057543.

* cited by examiner

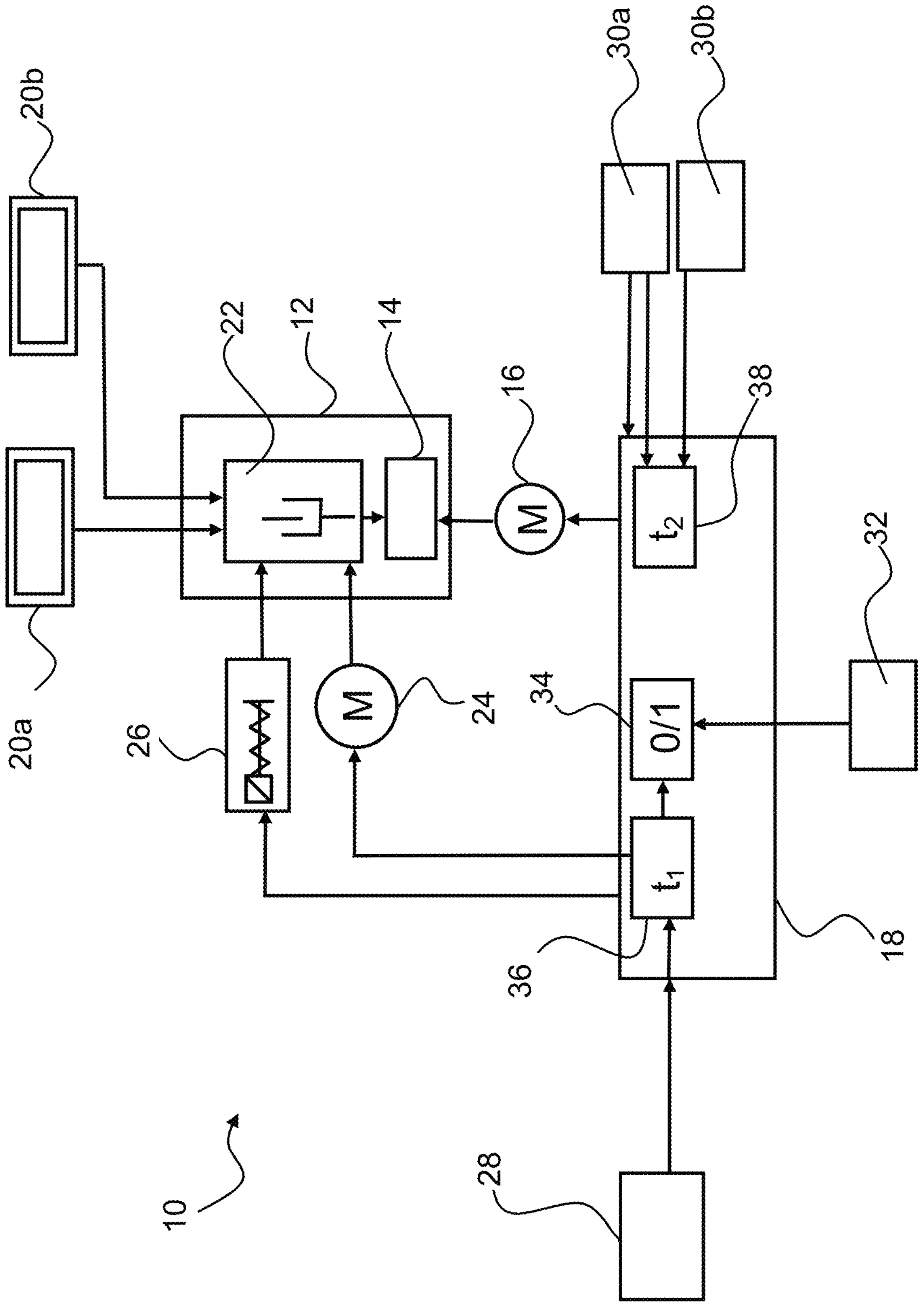
20b
20a
22
12
14
16
M
M
30a
30b
38
$t_2$
32
34
0/1
24
26
$t_1$
36
18
10
28

LOCKING DEVICE FOR A VEHICLE DOOR OF A MOTOR VEHICLE

BACKGROUND AND SUMMARY OF THE INVENTION

Exemplary embodiments of the invention relate to a locking device for a vehicle door of a motor vehicle, comprising a door lock, which enables at least one electrical and, in parallel thereto, a mechanical lock release via a mechanical operative connection to a first actuatable door handle, wherein a coupling is arranged in the mechanical operative connection between the first door handle and the door lock, which coupling can be engaged and disengaged via a coupling motor, further comprising a control unit, which can be connected to a crash sensor for detecting an accident situation. The invention further relates to a vehicle door equipped therewith and to a motor vehicle provided with at least one such vehicle door.

From DE 10 2015 008 122 A1 and DE 10 2016 114 494 A1, such locking devices are known which, upon detection of an emergency situation by a crash sensor, enable a manual, mechanical door opening, wherein, in the case of a crash signal, an actuator mechanically connected to the lock is transferred from a concealed to an extended position.

If a vehicle is mechanically locked, the vehicle door can no longer be opened from the outside in the event of a power failure due to a crash event.

Exemplary embodiments of the invention are directed to providing a locking device which, in the event of a crash, is capable under all circumstances, i.e., with or without the availability of electrical power, of first keeping the vehicle door locked but then enabling a door release.

According to an embodiment, this is addressed by the coupling in the mechanical operative connection between the door handle and the door lock always being in the disengaged state in the normal operating state irrespective of opening requirements, and this being able to be engaged and disengaged in addition to the coupling motor via an electromagnetic actuating device, which is designed to engage the coupling when the current is switched off, wherein the control unit further has a first timer device having a timer time $t_1$ that can be triggered by the signal from the crash sensor, such that, after the timer time $t_1$ has elapsed, the control unit, after receiving a crash signal, activates the coupling motor to engage the coupling.

In the design according to the invention, door unlocking is always exclusively electrical under normal conditions. A door opening request by pushbutton or switch, in particular an opening pushbutton or switch arranged on the inner or outer door handle, causes activation of the electric lock release unit and thus a lock release, unless a locked target state for the door lock is predetermined in the control device.

If, on the other hand, the vehicle is involved in an accident and a crash signal is present, the first timer device is started with a timer time $t_1$. During this timer time, an electrically triggered door opening request (e.g., as a result of an accident-related door deformation), which may have occurred unintentionally as a result of the accident, does not lead to a lock release. Only after the timer time $t_1$ has elapsed does an incoming door opening request (e.g., by an occupant in the vehicle or an accident rescuer from the outside) result in an electrically triggered lock release. At the same time, i.e., at the end of the timer time $t_1$, the coupling motor is activated to engage the coupling, whereby the mechanical operative connection between at least one door handle, preferably an outside handle, and the mechanical lock release unit is established. This makes it possible to open the door lock mechanically by actuating the door handle (preferably the outside door handle) that is mechanically coupled to the lock, even if the power supply is later interrupted either intentionally (by disconnecting the battery) or unintentionally (e.g., by a short circuit caused by an accident). If the power supply fails before the time $t_1$ has elapsed, possibly immediately after the crash signal, the power interruption causes the electromagnetic actuator, which is in the activated state when the power supply is present and the coupling is in the disengaged position, to fall into the de-energized basic position, wherein this moves the coupling into the engaged position. As a result, the door handle is mechanically coupled to the door lock automatically in the event of a power failure. This means that even in the event of a power failure, the door lock can still be opened mechanically.

In other words, the mechanical operative connection between the door handles and the lock is always disengaged, except in the event of an accident.

In an advantageous development of the invention, an electromechanical actuation unit can be provided in addition to the coupling motor, which can also be used to engage and disengage the coupling. In particular, this additional electromechanical actuation unit can increase accident safety. This is particularly the case if the locking device itself should be de-energized during the accident, and in this case engagement of the coupling is ensured so that the doors can be opened by helpers by means of the door handles.

After the timer $t_1$ has elapsed, the coupling motor is controlled to engage the coupling so that the mechanical unlocking path is available if the power supply is still present.

Preferably, the timer time $t_1$ is between 3 seconds and 10 seconds, even more preferably between 5 seconds and 7 seconds.

According to an advantageous development of the invention, a second door handle, preferably an interior door actuator, is in mechanical operative connection with the door lock via the coupling. Thus, the aforementioned applies in the same way to an interior door handle, which in this way can be used in the same way as the exterior handle in the event of a crash signal or a power failure—and only then—for mechanical door opening.

According to an advantageous development of the invention, the control unit has a second timer device having a timer time $t_2$, which checks whether a crash signal is present when a door opening request signal is received from electric door opening switches and only activates the electric lock release for door unlocking after the timer time $t_2$ has elapsed if no crash signal is present. This second timer time $t_2$ is significantly shorter than $t_1$ and lies between 50 msec and 150 msec, preferably between 80 msec and 120 msec. It is used to check whether a crash signal is present before executing an (electrical) door opening request and to execute this only if this is not the case.

According to an advantageous development of the invention, the electromagnetic actuating device is designed as a spring-loaded (monostable) latching relay which, when current is applied, tensions a spring and disengages the coupling, wherein the coupling is moved into the engaged state by the spring force when the current is switched off. In other words, it is a force spring accumulator that always has current flowing through it in the normal operating state and thus keeps the spring in a tensioned state.

According to an advantageous development, the control unit comprises a binary locking state storage unit which can assume two logical states 0 (unlocked) and 1 (locked), wherein only when the state is 0, a door opening request from electric door opening switches is forwarded to the electric lock release unit. If, on the other hand, the logical state is 1, the control unit refrains from forwarding any opening requests to the electric lock release unit in the normal operating state. The state of the locking state storage unit can be switched by an electric remote control or a central control unit of the vehicle or by means of a switch in the driver's area.

According to an advantageous design of the invention, the locking state storage unit is brought into the unlocked state by the control unit when a crash signal is received. This ensures that after a crash, a door opening is possible not only via the mechanical path but also in parallel via the electrical path, thus creating redundancy in the event that the mechanical operative connection has been damaged or destroyed by the crash.

The proposed solution according to the invention also provides an operationally safe, remotely controllable child safety lock, wherein the remote controllability can take place via switches in the interior or a radio remote control.

According to an advantageous design of the invention, the invention comprises a vehicle door for a motor vehicle having a locking device according to one or more of the preceding designs.

According to an advantageous design of the invention, the invention comprises a motor vehicle having at least one such vehicle door.

Further advantages, features and details emerge from the following description, in which an exemplary embodiment is described in detail with reference to the drawing.

BRIEF DESCRIPTION OF THE DRAWING FIGURE

The sole FIGURE illustrates a schematic functional diagram of the locking device according to the invention.

DETAILED DESCRIPTION

The locking device 10 shown in the sole figure comprises a door lock 12 having a locking unit 14 having at least one rotary latch and a pawl (not shown). The locking unit 14 can be actuated electrically as well as mechanically. Electrically, the actuation occurs by means of an electric lock drive 16, which in turn is controlled by a control unit 18. Mechanically, the locking unit 14 is actuated by an actuatable outer door handle 20*a* and an actuatable inner door handle 20*b* via suitable mechanical operative connections, preferably Bowden cables. An engageable and disengageable coupling 22 is located between the door handles 20*a*, 20*b* and the locking unit 14 in the mechanical operative connection. In the engaged state, the locking unit 14 can thus be opened by the door handles 20*a*, 20*b*. In the disengaged state of the coupling 22, however, actuation of the door handles 20*a*, 20*b* is ineffective. The coupling 22 has two parallel actuating inputs, namely a coupling motor 24 and an electromagnetic actuator 26, both of which are controlled by the control unit 18.

The control unit 18 is connected to a crash sensor 28, which provides a crash signal to the control unit 18 in the event of an accident situation. The control unit 18 is also connected to two door buttons 30*a*, 30*b* which are assigned to the door handles 20*a*, 20*b*. When one of the door handles 20*a*, 20*b* is actuated, the associated door button 30*a*, 30*b* is actuated, which triggers an electrical opening request signal for the door lock 12 in the control unit 18. Finally, the control unit 18 is connected to a locking signal transmitter 32, which is actuated, for example, by a remote control or a central vehicle control device, in order to keep the locking device 10 in the locked state or to allow unlocking. For this purpose, the locking signal transmitter is connected to a locking state storage unit 34, which is a component of the control unit 18. If the locking state storage unit 34 is in the state 0, i.e., is set to this state by the locking signal transmitter 32, opening requests by the door buttons 30*a*, 30*b* have no effect. However, if the locking state storage unit 34 is in the logic state 1, then when an opening request signal is present from one of the door buttons 30*a*, 30*b*, it is checked whether a crash signal is present and only after this check, preferably after a time delay $t_2$ has elapsed, is the lock drive 16 activated, which unlocks the locking unit 14.

The control unit 18 comprises a first timer device 36, which is triggered by a signal from the crash sensor 28, and a second timer device 38, which is triggered by a door opening request from the door buttons 30*a*, 30*b*.

In normal operation, the functionality depends on whether the locking state storage unit 34 is in the state 0 or 1. In state 0, nothing happens when an opening request signal is present, i.e., the operation of the door buttons 30*a*, 30*b* has no effect. In state 1, on the other hand, an opening request from a door button 30*a*, 30*b* is forwarded to the lock drive 16 after the timer time $t_2$ has elapsed.

If the crash sensor 28 has generated a crash signal, the first timer device 36 is started and preferably the locking state storage unit 34 is simultaneously set to state 1. After the timer time $t_1$ has elapsed, the locking state storage unit 34 is set to state 0 again, which enables door unlocking in the "normal" way. At the same time, the coupling motor 24 is switched on, engaging the coupling 22 and thus establishing a mechanical connection between the door handles 20*a*, 20*b* and the locking unit 14, such that a subsequent manual operation of one of the door handles 20*a*, 20*b* mechanically unlocks the locking unit 14.

The connection between the control unit 18 and the electromagnetic actuator 26 is merely a power supply, not a signal line, and serves only to keep the actuator 26 constantly energized and thus in a mechanically biased state. Only in the event of a power failure in the control unit 18 does the actuating device 26 fall into the mechanically relaxed basic state, wherein at the same time the coupling 22 is engaged by a mechanical connection, such that in the event of a power failure, a mechanical door unlocking via the door handles 20*a*, 20*b* is possible in any case.

Although the invention has been illustrated and explained in more detail by preferred exemplary embodiments, the invention is not limited by the disclosed examples and other variations can be derived therefrom by persons skilled in the art without departing from the scope of protection of the invention. It is thus clear that a plurality of possible variations exists. It is also clear that exemplary embodiments are really only examples which are not to be understood in any way as limiting, for example, the scope of protection, the possible applications or the configuration of the invention. Rather, the preceding description and the description of the figures enable the person skilled in the art to implement the exemplary embodiments in a concrete manner, wherein the person skilled in the art, being aware of the disclosed idea of the invention, can make a variety of changes, for example with regard to the function or the arrangement of individual elements mentioned in an exemplary embodiment, without leaving the scope of protection defined by the claims and their legal equivalents, such as further explanations in the description.

The invention claimed is:

1. A locking device for a vehicle door of a motor vehicle, the locking device comprising:

a door lock configured to be electrically, and in parallel, mechanically released via a mechanical operative connection to a first actuatable door handle;

a coupling arranged in the mechanical operative connection between the first actuatable door handle and the door lock;

a coupling motor configured to engage and disengage the coupling; and a control unit connected to a crash sensor, which is configured to detect an accident situation, wherein the control unit includes a first timer device with a first timer time and which is triggerable by a signal of the crash sensor, such that the control unit, after the first timer time has elapsed after receiving a crash signal, activates the coupling motor to engage the coupling; and an electromagnetic actuating device configured to engage and disengage the coupling, wherein the electromagnetic actuating device is configured to engage the coupling in event of a power failure of the motor vehicle, wherein in a normal operating state, the coupling is always in a disengaged state irrespective of opening requirements, and wherein the electromagnetic actuating device is a spring-loaded monostable latching relay which, when current is switched off, moves the coupling into an engaged state.

2. The locking device of claim 1, wherein an interior door actuator is in mechanical operative connection with the door lock via the coupling.

3. The locking device of claim 1, wherein the control unit has a second timer device having a second timer time which, wherein the second timer device, on receipt of a door opening request signal from electric door opening switches, checks whether the crash signal is present and only activates the door lock for electrical release to release the door after the second timer time has elapsed and no crash signal is present.

4. The locking device of claim 3, wherein the first timer time is between 5 seconds and 7 seconds.

5. The locking device of claim 4, wherein the second timer time is between 80 msec and 120 msec.

6. The locking device of claim 1, wherein the control unit comprises a binary locking state storage unit configured to forward a door opening request from electric door opening switches to an electric lock release unit only when a locking state is 0.

7. The locking device of claim 6, wherein the control unit, on receipt of the crash signal, switches the binary locking state storage unit into an unlocked state.

8. A vehicle door for a motor vehicle, comprising:

a first actuatable door handle; and a locking device configured to lock the vehicle door, the locking device comprising:

a door lock configured to be electrically, and in parallel, mechanically released via a mechanical operative connection to the first actuatable door handle;

a coupling arranged in the mechanical operative connection between the first actuatable door handle and the door lock;

a coupling motor configured to engage and disengage the coupling; and a control unit connected to a crash sensor, which is configured to detect an accident situation, wherein the control unit includes a first timer device with a first timer time and which is triggerable by a signal of the crash sensor, such that the control unit, after the first timer time has elapsed after receiving a crash signal, activates the coupling motor to engage the coupling; and an electromagnetic actuating device configured to engage and disengage the coupling, wherein the electromagnetic actuating device is configured to engage the coupling in event of a power failure of the motor vehicle, wherein in a normal operating state, the coupling is always in a disengaged state irrespective of opening requirements, and wherein the electromagnetic actuating device is a spring-loaded monostable latching relay which, when current is switched off, moves the coupling into an engaged state.

9. The vehicle door of claim 8, wherein an interior door actuator is in mechanical operative connection with the door lock via the coupling.

10. The vehicle door of claim 8, wherein the control unit has a second timer device having a second timer time which, wherein the second timer device, on receipt of a door opening request signal from electric door opening switches, checks whether the crash signal is present and only activates the door lock for electrical release to release the door after the second timer time has elapsed and no crash signal is present.

11. The vehicle door of claim 8, wherein the control unit comprises a binary locking state storage unit configured to forward a door opening request from electric door opening switches to an electric lock release unit only when a locking state is 0.

12. The locking device of claim 11, wherein the control unit, on receipt of the crash signal, switches the binary locking state storage unit into an unlocked state.

13. A motor vehicle, comprising:

at least one vehicle door, which comprises:

a first actuatable door handle; and a locking device configured to lock the vehicle door, the locking device comprising:

a door lock configured to be electrically, and in parallel, mechanically released via a mechanical operative connection to the first actuatable door handle;

a coupling arranged in the mechanical operative connection between the first actuatable door handle and the door lock;

a coupling motor configured to engage and disengage the coupling; and a control unit connected to a crash sensor, which is configured to detect an accident situation, wherein the control unit includes a first timer device with a first timer time and which is triggerable by a signal of the crash sensor, such that the control unit, after the first timer time has elapsed after receiving a crash signal, activates the coupling motor to engage the coupling; and an electromagnetic actuating device configured to engage and disengage the coupling, wherein the electromagnetic actuating device is configured to engage the coupling in event of a power failure of the motor vehicle, wherein in a normal operating state, the coupling is always in a disengaged state irrespective of opening requirements, and wherein the electromagnetic actuating device is a spring-loaded monostable latching relay which, when current is switched off, moves the coupling into an engaged state.

14. The motor vehicle of claim 13, wherein an interior door actuator is in mechanical operative connection with the door lock via the coupling.

15. The motor vehicle of claim 13, wherein the control unit has a second timer device having a second timer time which, wherein the second timer device, on receipt of a door opening request signal from electric door opening switches, checks whether the crash signal is present and only activates the door lock for electrical release to release the door after the second timer time has elapsed and no crash signal is present.

16. The motor vehicle of claim 13, wherein the control unit comprises a binary locking state storage unit configured to forward a door opening request from electric door opening switches to an electric lock release unit only when a locking state is 0.

17. The motor vehicle of claim 16, wherein the control unit, on receipt of the crash signal, switches the binary locking state storage unit into an unlocked state.

* * * * *